United States Patent [19]

Bartley et al.

[11] Patent Number: 5,521,342

[45] Date of Patent: May 28, 1996

[54] SWITCH HAVING COMBINED LIGHT PIPE AND PRINTED CIRCUIT BOARD

[75] Inventors: Robert M. Bartley, Ravenna; Michael S. Zwolinski, Warren; Mark E. Burns, Burton, all of Ohio

[73] Assignee: General Motors Corporation, Detroit, Mich.

[21] Appl. No.: 363,845

[22] Filed: Dec. 27, 1994

[51] Int. Cl.⁶ .......................... H01H 13/70; F21V 33/00
[52] U.S. Cl. ........................ 200/5 A; 200/314; 362/31; 362/95
[58] Field of Search ..................... 200/5 R, 5 A, 200/512–517, 311–317; 341/20–35; 362/29–32, 95

[56] References Cited

U.S. PATENT DOCUMENTS

| | | | |
|---|---|---|---|
| 3,860,771 | 1/1975 | Lynn et al. | 200/5 A |
| 4,177,501 | 12/1979 | Karlin | 362/26 |
| 4,288,672 | 9/1981 | Puccini | 200/314 |
| 4,343,975 | 9/1981 | Sado | 200/314 |
| 4,636,593 | 1/1987 | Novak et al. | 200/5 A |
| 4,644,326 | 2/1987 | Villalobos et al. | 200/5 A X |
| 4,772,769 | 9/1988 | Shumate | 200/314 |
| 4,839,474 | 6/1989 | Pankhurst et al. | 200/5 A |
| 4,892,981 | 1/1990 | Soloway et al. | 200/5 A |
| 4,937,408 | 6/1990 | Hattori et al. | 200/314 |
| 5,128,842 | 7/1992 | Kenmochi | 362/95 |
| 5,153,590 | 10/1992 | Charlier | 362/31 |

OTHER PUBLICATIONS

Assignee's copending application 08/279,147 filed Jul. 22, 1994.

*Primary Examiner*—J. R. Scott
*Attorney, Agent, or Firm*—William A. Schuetz; Cary W. Brooks

[57] ABSTRACT

An illuminated elastomeric keypad switch assembly has an optical conductor on which a printed circuit is printed via electrically conductive ink and a keypad provided with translucent areas for passage of light. The optical conductor has recesses located adjacent the key caps whose width and depth progressively increases proceeding from the closest to the farthest key cap from a light source so that a uniform amount of light is transmitted through the key caps.

11 Claims, 2 Drawing Sheets

SWITCH HAVING COMBINED LIGHT PIPE AND PRINTED CIRCUIT BOARD

The present invention relates to an elastomeric keypad switch assembly and, more particularly, to an illuminated, elastomeric keypad switch assembly having a combined light pipe and printed circuit board and key caps which are evenly illuminated regardless of the distance of the key cap from a single light source.

BACKGROUND OF THE INVENTION

It is common in automotive applications to illuminate switch assemblies so that they can be easily located and identified in a darkened environment, such as nighttime driving. These switches are usually located on a vehicle dashboard or on an interior door trim panel.

It is also common to employ elastomeric keypad switch assemblies having depressible key caps for moving an electrically conductive pellet mounted on its underside into and out of engagement with contacts on a printed circuit board. A common method of illuminating such a switch assembly is to mold the keypad out of a clear or translucent material and then paint the visible surface. A laser is then employed to etch a symbol or word on the key which exposes the clear material. Light can then be transmitted through the exposed etched symbol or word in the key caps of the keyboard by an optical conductor located beneath the keypad. Another obvious way to illuminate the switch assembly is to provide for an overhead lighting system and shine a light onto the surface of the switch assembly.

In copending application, Ser. No. 08/279,147, filed Jul. 22, 1994, and assigned to the same assignee as the present invention, there is disclosed an elastomeric keypad switch assembly in which a halo light effect surrounding the key caps is provided.

That keypad switch assembly comprised a planar optical conductor for connection to a light source, a separate printed circuit means having a transparent base secured to the optical conductor, and a one piece keypad made from an elastomeric material which overlaid the printed circuit means. The keypad had an opaque base a plurality of opaque key caps each having a bottom surface carrying an electrically conductive pellet and located above a pair of contact ends on printed circuit lines of the printed circuit board, thin annular translucent webs for integrally connecting the key caps to the keypad and with the key caps each having an outer peripheral side wall which was spaced inwardly from a side wall of the keypad surrounding the key caps and with the thin annular webs being integral with the side wall of the keypad adjacent its underside and integral with the key caps adjacent its bottom side. The thin annular webs functioned to bias the caps toward a normal position and which the pellets were spaced from the contact ends of the printed circuit lines. The key caps were depressible to deflect the annular webs to move the pellets to engage the contact ends of the printed circuit lines to complete a circuit. The annular webs functioned as both a spring to bias the key caps toward their normal position and to transmit light therethrough and with the side walls of the keypad serving to direct light through the webs to create a visible halo lighting effect surrounding the key caps.

SUMMARY OF THE INVENTION

The present invention is an improvement over the aforementioned pending patent application, Ser. No. 08/279,147 in that the separate printed circuit board is eliminated, a one piece combined light pipe and printed circuit board is provided in its place and in that the key caps are evenly illuminated regardless of the distance of any one key cap from a single light source for illuminating the light pipe.

The combined light pipe or optical conductor and printed circuit board comprises a one piece, planar, plastic light pipe, preferably made from a polycarbonate material, having a printed circuit printed on a smooth side thereof. The printed circuit comprises a plurality of electrically conductive ink tracings, preferably ink tracings containing silver or carbon particles. The ink tracings each have one end terminating adjacent one end of the light pipe for connection to a wiring harness and its other end terminating in a contact which is adapted to be engaged by a pellet carried by one of the key caps. By printing a printed circuit directly onto the light pipe, the need for a separate transparent printed circuit board is eliminated.

Key caps are provided with translucent areas to permit light from the light pipe to pass therethrough so that the key caps are illuminated and thus, can be easily located. The translucent areas are preferably thin, annular webs surrounding the key caps so that a halo lighting effect surrounding the key caps is achieved.

To achieve an even or substantially even distribution of light around each key cap, the optical conductor or light pipe has recesses extending inwardly from its side opposite the side containing the printed circuits and at a location adjacent the key caps. The recesses preferably are coextensive with the annular web of the key caps. The recesses have both depths and widths which are progressively deeper and wider proceeding from the key cap located closest to a light source to the key cap located farthest from the light source whereby a uniform amount of light is transmitted through the translucent webs surrounding the key caps to provide halo lighting effects which are substantially the same regardless of the distance from the light source.

The present invention further resides in various novel constructions and arrangement of parts, and further objects, novel characteristics and advantages of the present invention will be apparent to those skilled in the art to which it relates and from the following detailed description of the illustrated, preferred embodiment thereof made with reference to the accompanying drawings forming a part of this specification and in which similar reference numerals are employed to designate corresponding parts throughout the several views, and in which.

Figure 1:
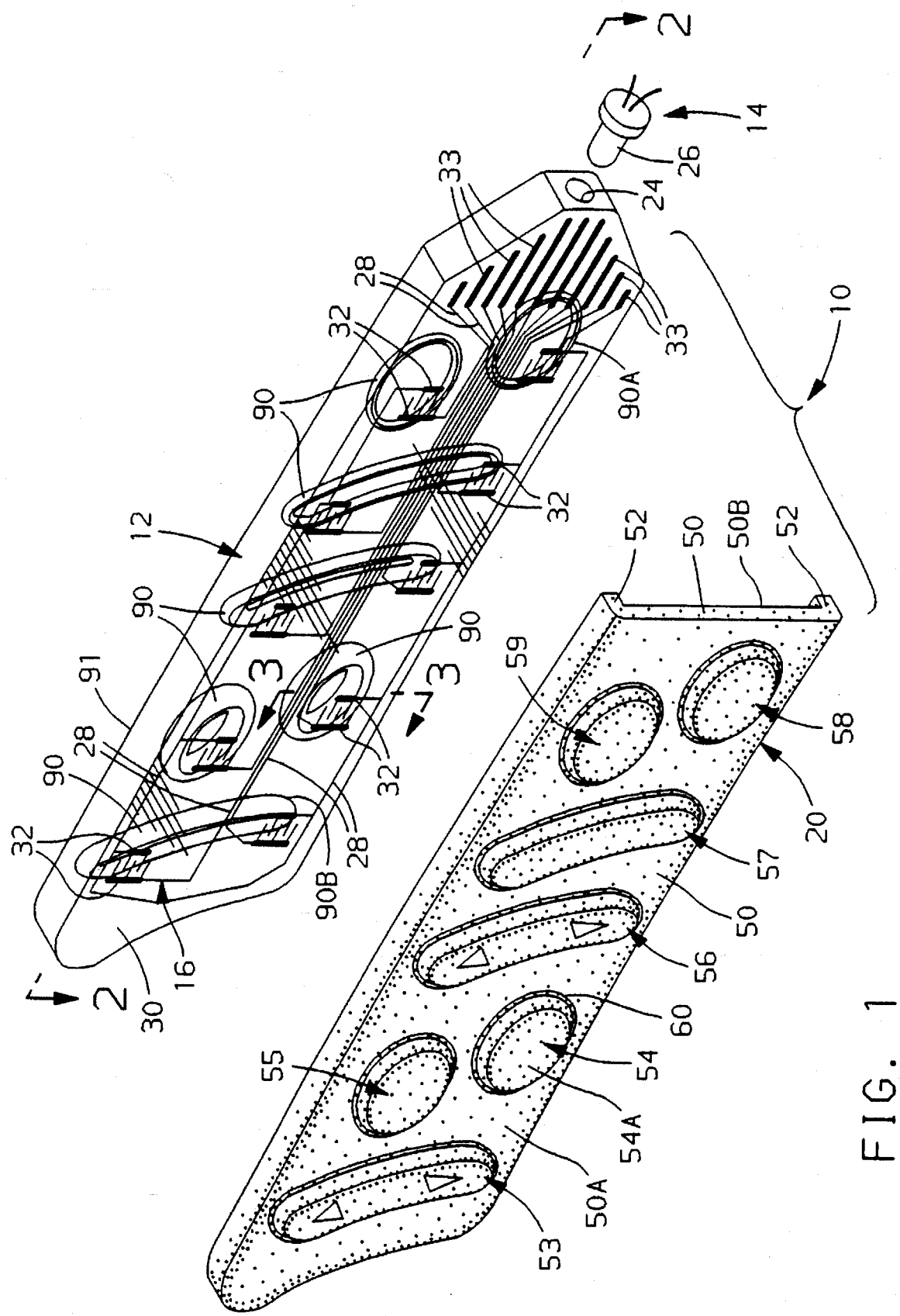
FIG. 1 is an exploded perspective view of an elastomeric keypad switch assembly embodying the present invention.

The present invention provides a novel elastomeric keypad switch assembly 10. The switch assembly 10 comprises, in general, an optical light transmitting conductor or light pipe 12 which is adapted to be operatively connected with a suitable light source 14, a printed circuit means 16 which is printed onto the optical conductor 12 and which is adapted to be electrically connected to various electrical devices to be energized and de-energized and a one piece keypad 20 made from an elastomeric material and overlying the printed circuit means 16.

The optical conductor or light pipe 12 comprises a one piece member, preferably a planar member, made from a suitable light conducting material, such as a polycarbonate material. The planar member has a bulb or fiber optic receiving opening 24 at its right end, as viewed in FIG. 1, for receiving a bulb or fiber optics 26 of the light source 14.

The printed circuit means 16 comprises a plurality of printed circuit lines or traces 28 which are printed directly onto a smooth surface side 30 facing the keypad 20. As best shown in FIG. 1, pairs of the printed circuit lines 28 at one end terminate in contacts or contact ends 32 which are located closely adjacent each other and all circuit lines 28 at their other ends terminate in closely spaced contacts or contact ends 33 adjacent the right end of the light pipe 12. The printed circuit lines 28 are printed using an electrically conductive ink, preferably an electrically conductive ink containing silver particles. The ends 33 of the lines 28 would be connectable to input and output conductors of a suitable wiring harness (not shown) which is connected thereto in any suitable or conventional manner.

The keypad 20 is of a one piece, molded elastomeric construction and fit comprises a planar base 50 having an integral flange 52 extending perpendicular thereto around three sides thereof, as viewed in FIG. 1. The keypad 20 can be secured to the light pipe 12 by any suitable means, but is preferably adhesively secured to the light pipe 12 and is shaped complementary to the light pipe 12. That is, the flange 52 extends along its upper side, its left side and its lower side, as viewed in FIG. 1. The base 50 is planar and is molded of a thickness such that it is opaque, i.e., no light can be transmitted therethrough from the light pipe 12.

Figure 3:
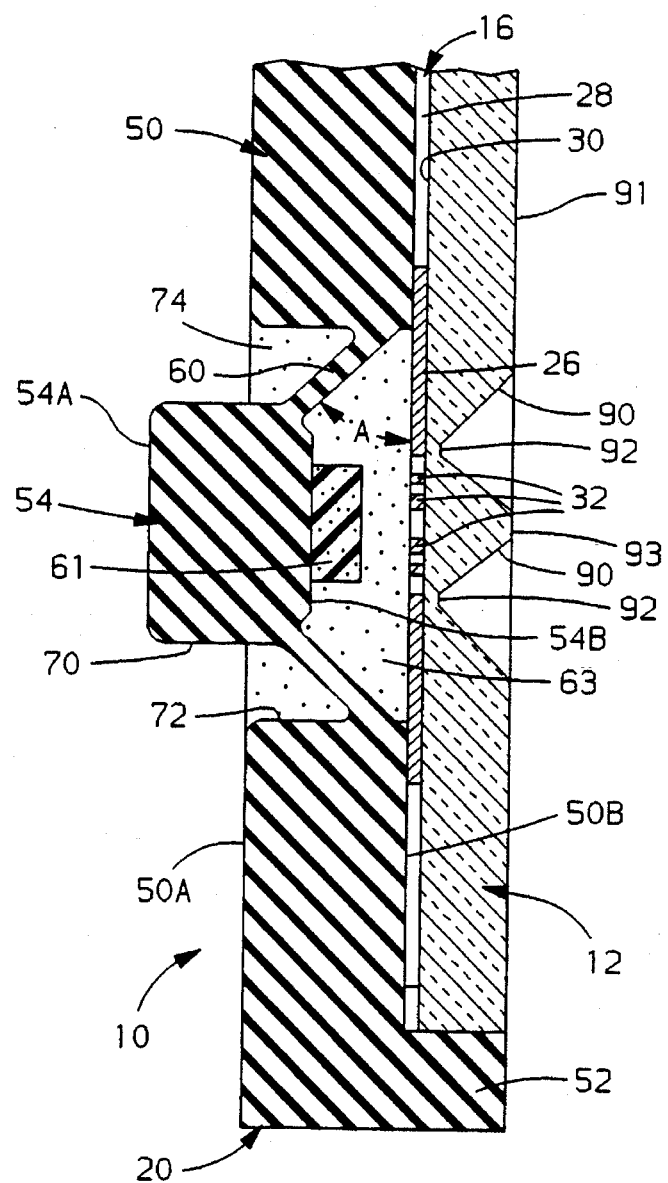
FIG. 3 is an enlarged fragmentary, cross-sectional view of a switch assembly when assembled and taken approximately along line 3—3 of FIG. 1.

The keypad 20 also includes a plurality of opaque key caps 53–59 integrally connected with the base 50. The key caps 53–59, except for their overall shape, are of an identical construction and hence only the key cap 54 will be described in detail, and corresponding parts of the key caps 55–59 will be given the same reference numerals. The key cap 54 is integrally connected with the base 50 by an annular web 60 surrounding the key cap 54. The key cap 54 is of the same approximate thickness as the base 50 so that it is opaque, i.e., no light can be transmitted through the key cap 54 from the light pipe 12. The key cap 54 has an upper surface 54A which is substantially planar and located outwardly from or above the exterior side 50A of the base 50. The key cap 54 has a planar bottom surface 54B to which a suitable electrically conductive pellet 61 is secured. The bottom surface 54B is disposed above and spaced from the plane of the surface 30 of the light pipe 12. The top and bottom surfaces 54A and 54B, respectively, lie in planes which are parallel to the plane of the upper surface 50A of the base 50 of the key pad 20. The pellet 61 bridges a pair of the spaced contact ends 32 of a pair of the printed circuit lines 28. The bottom surface 54B of key cap 54, the annular web 60 and the base 50 at its bottom side 50B define a trapezoidally shaped recess 63. The web 60 is integrally connected with the base 50 adjacent its bottom side 50B and is integrally connected with the key cap 54 adjacent its bottom side or bottom 54B. The web 60 is thin and of a uniform thickness. As shown in FIG. 3, the web 60 lies in a plane which forms an acute included angle A with the side 30 of the light pipe 12. The web 60 is translucent in that it is thin enough to allow light to pass therethrough from the light pipe 12.

The key cap 54 has a peripheral side 70 which is spaced inwardly from side 72 of the base 50 to define an annular well or recess 74 in the base 50. The annular recess or well 74 is defined by the sides 70, 72 of the key cap 54 and the base 50, respectively, and the annular web 60. The sides 70 of the key cap 54 extends perpendicular to the plane of the light pipe 12 and the side 72 in the base 50 also extends perpendicular to the plane of the light pipe 12. The perpendicular side 72 of the base 50 serves to direct light being transmitted from the light pipe 12 via the web 60 upwardly to create a halo lighting effect surrounding the key cap 54.

The annular web 60 serves as a spring means for biasing the key cap 54 toward a normal position, as shown in FIG. 3, in which the pellet 61 carried thereby is disposed above the contact ends 32 of a printed circuit lines 28. The web 60 can be deflected by depression of the key cap 54 to move the pellet 61 into engagement with the contact ends 32 of the lines 28 of a printed circuit to complete an electric circuit to energize or de-energize an electrical device. Upon release of the key cap 54, the web 60 will return the key cap 54 to its normal position. The annular web 60 also serves to transmit light therethrough and with the side wall 72 of the keypad 20 serving to direct the light through the web 60 to create a highly visible halo lighting effect around the key cap 54.

The keypad 20 and its key caps 53–59 can be designed to control the energization and de-energization of any variety or suitable electrical devices (not shown). The key cap 53 could, for example, be used as a tuning control, as indicated by depressing the key cap at its upper and lower ends. The key caps 54 and 55 could be used to control an on/off function, such as a seat heater. The key cap 56 could be used to control tile on/off of a defroster. The key caps 57-59 could be used to control the on/off and memory positions of a power operated seat adjuster.

It should be noted that the keypad 20 can be molded from a suitable elastomeric material having virtually any color. However, the webs 60 of extreme dark colors, such as black, will not be as translucent as light colors. The light transmitted from the light pipe 12 through the transparent printed circuit means 16 and through the webs 60 will have the same color as the keypad itself so that the halo light will be of a complementary color by taking on the coloration of the keypad 20.

Another important feature of the novel elastomeric key pad switch assembly 10 of the present invention is that the amount of light transmitted through the annular webs 60 of the various key caps 53–59 is uniform or substantially uniform regardless of the distance of the key cap from the light source 14. This is accomplished by providing recesses 90 which extend inwardly of the light pipe 12 from its side 91 opposite the side 30 on which the printed circuit means 16 is printed. The recesses are annular, coextensive with the webs 60 of the key caps 53–59 and are located directly beneath the annular webs of the key caps 53–59.

Figure 2:
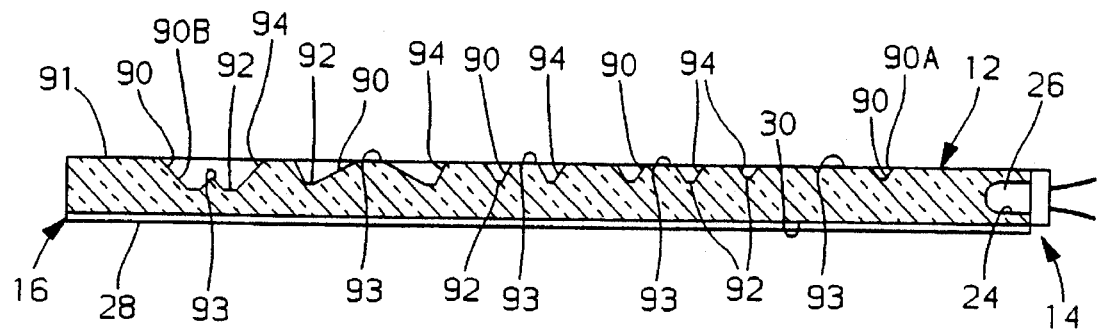
FIG. 2 is an enlarged, cross-sectional view of part of the elastomeric keyboard switch assembly shown in FIG. 1 and taken approximately along lines 2—2 of FIG. 1.

The recesses 90 have a width and a depth, as best shown in FIG. 2, which progressively increases proceeding from the recess 90A located closest to the light source 14 and the recess 90B located furthest from the light source 14. The recesses are substantially V-shaped, as viewed in cross section, but have small planar bottoms 92. The recesses also define central islands 93 whose width progressively decreases from the recess 90A located most closely to the light source to the recess 90B located farthest from the light source 14. The recesses 90 serve to concentrate the light being transmitted through the light pipe 12 at the sides 94 defining the recesses 90.

By varying the width and depth of the recesses 90, as defined above, the light from the light source 14 will be substantially uniformly transmitted to the sides 94 of the recesses 90 so that a substantially uniform amount of light emanates from the sides 94 of the recesses 90 so that the light transmitted to the web 60 of the key caps 53–59 will be uniform or substantially uniform.

From the foregoing, it should be readily apparent that a very simple, inexpensive illuminated keypad switch assembly 10 has been provided. By combining the light pipe 12 and printed circuit means 16, the need for a separate printed circuit board is eliminated. Moreover, by providing recesses of differing widths and depths, a uniform distribution of light around the key caps is provided regardless of the distance of the key cap from the single light source 14. Further, the two items, namely, the light pipe 12 and the keypad 20 can be made relatively thin. When the parts are secured together, a thin switch package is provided which can be readily attached to an interior panel of an automotive vehicle, such as a dashboard, door trim panel, etc.

Although the illustrated embodiment hereof has been described in great detail, it should be apparent that certain modifications, changes and adaptations may be made in the illustrated embodiment, and that it is intended to cover all such modifications, changes and adaptations which come within the spirit of the present invention.

The embodiments of the invention in which an exclusive property or privilege is claimed are defined as follows:

1. An illuminated elastomeric keypad switch assembly comprising a light pipe which is adapted to be connected with a light source, a printed circuit on one side of said light pipe and which is adapted to be electrically connected to various electrical devices to be energized and de-energized, said printed circuit comprising a plurality of circuit traces printed directly on said base which terminate in contact ends closely adjacent each other, whereby the light pipe and printed circuit are combined, a keypad made from an elastomeric material and overlying said printed circuit, said keypad including an opaque base and a plurality of spaced key caps each having a bottom surface carrying an electrically conductive pellet and located above a pair of said contact ends, said key caps being depressible to move the pellets carried thereby to engage contact ends of said printed circuit traces located therebeneath to complete a circuit, said key caps having translucent areas to permit light therethrough to illuminate the key caps.

2. An illuminated elastomeric keypad switch assembly comprising a light pipe which is adapted to be connected with a light source, a printed circuit on one side of said light pipe and which is adapted to be electrically connected to various electrical devices to be energized and de-energized, said printed circuit comprising a plurality of printed circuit traces on said base which terminate in contact ends closely adjacent each other, a keypad made from an elastomeric material and overlying said printed circuit means, said keypad including an opaque base and a plurality of spaced key caps each having a bottom surface carrying an electrically conductive pellet and located above a pair of said contact ends, said key caps being depressible to move the pellets carried thereby to engage contact ends of said printed circuit traces located therebeneath to complete a circuit, said key caps having translucent areas to permit light therethrough, said light pipe having recesses extending inwardly from its side which is opposite to said one side and at locations adjacent said key caps, said recesses having depths which are progressively deeper proceeding from the key cap located closest to said light source to the key cap located farthest from said light source whereby a substantially uniform amount of light is transmitted through said translucent areas of said key caps regardless of its distance from the light source.

3. An illuminated elastomeric keypad switch assembly as defined in claim 1 and wherein said recesses have widths which are progressively wider proceeding from the key cap located closest to the light source to the key cap located farthest from the light source.

4. An illuminated elastomeric keypad switch assembly comprising a light pipe which is adapted to be connected with a light source, a printed circuit means printed on one side of said light pipe and which is adapted to be electrically connected to various electrical devices to be energized and de-energized, said printed circuit means comprising a plurality of printed circuit traces on said base which terminate in contact ends closely adjacent each other, a keypad made from an elastomeric material and overlying said printed circuit means, said keypad including an opaque base, a plurality of spaced opaque key caps each having a bottom surface carrying an electrically conductive pellet and located above a pair of said contact ends, and thin annular translucent webs integral with the base of the keypad and the key caps through which light passes to create a halo lighting effect surrounding the key caps, said key caps being depressible to move the pellets carried thereby to engage said contact ends of said printed circuit traces located therebeneath to complete a circuit, said webs deflecting when said key caps are depressed and returning said key caps toward their normal position when the key caps are released, said light pipe having recesses extending inwardly from its other side which is opposite to said one side and which are coextensive with and located directly underneath said webs of said key caps, said recesses having widths and depths which are progressively deeper proceeding from the key cap located closest to said light source to the key cap located farthest from said light source whereby a substantially uniform amount of light is transmitted through said translucent webs of said key caps regardless of its distance from the light source.

5. An illuminated elastomeric keypad switch assembly, as defined in claim 4, and wherein said recesses have outer sides which are sloped so as to define an acute included angle with said other side.

6. An illuminated elastomeric keypad switch assembly, as defined in claim 5, and wherein said recesses define an inner island.

7. An illuminated elastomeric keypad switch assembly, as defined in claim 4, and wherein said recesses are V-shaped as viewed in cross section.

8. An illuminated elastomeric switch assembly as defined in claims 1 or 4 and wherein said printed circuit traces are printed on said one side with electrically conductive ink.

9. An illuminated elastomeric keypad switch assembly comprising a planar, rigid light pipe which is adapted to connect with a light source, a printed circuit means printed on one side of said light pipe and which is adapted to be electrically connected to various electrical devices to be energized and de-energized, said printed circuit means comprising a plurality of printed circuit lines on said base which terminate in contact ends closely adjacent each other, a one piece keypad made from an elastomeric material, said keypad having an opaque base of a thickness such that light from the optical conductor does not pass therethrough, said keypad having a plurality of first recesses on its underside and with each of the first recesses overlying at least one pair of adjacent contact ends of the printed circuit lines, said keypad also having a second plurality of recesses on its exterior side each defined in part by an annular side on said keypad which is substantially perpendicular to said keypad, a plurality of opaque key caps each having a bottom surface carrying an electrically conductive pellet, a top exterior surface disposed above the exterior side of said base of said keypad and an annular peripheral side wall extending substantially perpendicular to said keypad base and spaced inwardly from said annular side wall on the exterior side of said keypad, and a thin annular translucent web integral with said annular side wall of said key pad adjacent its underside and integral with said peripheral side wall of the key cap adjacent its bottom side, said annular side walls of said keypad, side walls of said key caps and said thin webs defining annular recesses in said key pad surrounding said key caps, said thin annular webs biasing said key caps toward a normal position in which said pellets carried by said key caps are spaced from the contact ends of said printed circuit lines, said key caps being depressible to deflect said annular webs to move the pellets carried thereby to engage said contact ends of said printed circuit lines to complete a circuit, said annular webs functioning as both a spring to bias the key caps toward their normal position and to transmit light therethrough and with the side walls of the keypad serving to direct light through the webs to create a halo lighting effect surrounding said key caps.

said light pipe having recesses extending inwardly from its other side which is opposite to said one side and which are coextensive with and located directly underneath said webs of said key caps, said recesses having widths and depths which are progressively deeper proceeding from the key cap located closest to said light source to the key cap located farthest from said light source whereby a substantially uniform amount of light is transmitted through said translucent webs of said key caps regardless of its distance from the light source.

10. An illuminated elastomeric keypad switch assembly, as defined in claim 9, and wherein said printed circuit is printed on said one side with electrically conductive ink.

11. An illuminated elastomeric keypad switch assembly, as defined in claim 10, and wherein said third recesses are V-shaped as viewed in cross section.

* * * * *